United States Patent
He et al.

(10) Patent No.: US 8,934,361 B2
(45) Date of Patent: Jan. 13, 2015

(54) DOWNLINK INTER-CELL INTERFERENCE COORDINATION METHOD AND ENB

(75) Inventors: Yuan He, Beijing (CN); Dengkun Xiao, Beijing (CN); Jian Huang, Beijing (CN); Chunfeng Yao, Beijing (CN); Yaojun Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 538 days.

(21) Appl. No.: 13/264,963

(22) PCT Filed: Apr. 17, 2009

(86) PCT No.: PCT/CN2009/071341
§ 371 (c)(1),
(2), (4) Date: Oct. 17, 2011

(87) PCT Pub. No.: WO2010/118582
PCT Pub. Date: Oct. 21, 2010

(65) Prior Publication Data
US 2012/0033570 A1 Feb. 9, 2012

(51) Int. Cl.
| | |
|---|---|
| H04L 12/26 | (2006.01) |
| H04W 4/00 | (2009.01) |
| H04J 4/00 | (2006.01) |
| H04L 5/00 | (2006.01) |
| H04W 16/10 | (2009.01) |

(52) U.S. Cl.
CPC .............. *H04L 5/0062* (2013.01); *H04L 5/001* (2013.01); *H04L 5/0037* (2013.01); *H04L 5/0073* (2013.01); *H04L 5/0091* (2013.01); H04L 5/0007 (2013.01); H04W 16/10 (2013.01)
USPC ........... 370/252; 370/329; 370/332; 370/436; 370/478

(58) Field of Classification Search
None
See application file for complete search history.

(56) References Cited

U.S. PATENT DOCUMENTS

| | | | |
|---|---|---|---|
| 2005/0148368 A1 | 7/2005 | Schienert et al. | |
| 2006/0187887 A1* | 8/2006 | Kim et al. | ..................... 370/335 |

(Continued)

FOREIGN PATENT DOCUMENTS

| | | |
|---|---|---|
| CN | 1992962 A | 7/2007 |
| CN | 1997217 A | 7/2007 |

(Continued)

OTHER PUBLICATIONS

Office Action issued in corresponding Chinese Patent Application No. 200980000106.9, mailed Jul. 3, 2012.

(Continued)

*Primary Examiner* — Yemane Mesfin
*Assistant Examiner* — Peter Chen
(74) *Attorney, Agent, or Firm* — Brinks Gilson & Lione (57) ABSTRACT

Embodiments of the present invention disclose a downlink Inter-Cell Interference Coordination (ICIC) method and relate to the wireless communication field. The method includes: obtaining information about multiple carriers in a current cell; obtaining, according to the information about the multiple carriers, a downlink ICIC parameter corresponding to each carrier of the multiple carriers; and sending the downlink ICIC parameter corresponding to each carrier to a neighboring cell of the current cell so as to enable the neighboring cell to perform, according to the downlink ICIC parameter, downlink interference coordination with the first cell. The embodiments of the present invention are applicable to downlink ICIC in a multi-carrier system.

9 Claims, 5 Drawing Sheets

(56) References Cited

U.S. PATENT DOCUMENTS

| | | | |
|---|---|---|---|
| 2008/0316969 A1 | 12/2008 | Prakash et al. | |
| 2009/0082054 A1* | 3/2009 | Li et al. | 455/522 |
| 2009/0264077 A1* | 10/2009 | Damnjanovic | 455/63.1 |
| 2010/0015967 A1* | 1/2010 | Perets et al. | 455/422.1 |
| 2010/0203882 A1* | 8/2010 | Frenger et al. | 455/423 |
| 2010/0226340 A1* | 9/2010 | Tayloe et al. | 370/332 |

FOREIGN PATENT DOCUMENTS

| | | | |
|---|---|---|---|
| CN | 101047930 A | 10/2007 | |
| CN | 101094216 A | 12/2007 | |
| CN | 101145814 A | 3/2008 | |
| CN | 101350640 A | 1/2009 | |
| CN | 101534560 A | 9/2009 | |
| CN | 101795471 A | 8/2010 | |
| EP | 1478102 A1 | 11/2004 | |
| EP | 1793509 A1 | 6/2007 | |
| EP | 1991017 A1 | 11/2008 | |
| EP | 2007163 A2 | 12/2008 | |
| WO | WO 2008000180 A1 | 1/2008 | |
| WO | WO 2008/022887 A1 | 2/2008 | |
| WO | WO 2010088854 A1 | 8/2010 | |

OTHER PUBLICATIONS

Supplementary European Search Report issued in corresponding European Patent Application No. 09 84 3216; dated Jun. 22, 2012.

Boudreau, Gary et al. "Interference Coordination and Cancellation for 4G Networks" IEEE Communications Magazine. Apr. 2009:74-81.

Astély, David et al. "LTE: The Evolution of Mobile Broadband" IEEE Communications Magazine. Apr. 2009:44-51.

Written Opinion of the International Searching Authority issued in corresponding PCT Patent Application No. PCT/CN2009/071341, mailed Jan. 28, 2010.

International Search Report issued in corresponding PCT Patent Application No. PCT/CN2009/071341, mailed Jan. 28, 2010.

Zeng et al., "Reducing the Feedback Overhead for Adaptive MIMO Multicarrier Transmission" Communications and Networking in China, 2007.

Nokia Siemens Networks et al., Way Forward on Relative Narrowband TX Power Indicator for DL ICIC 7.3.2. 3GPP TSG RAN WG1 #53 Meeting, Kansas City, USA. May 5-9 2008. R1-082179.

Arib, Evolved Universal Terrestrial Radio Access (E-UTRA); Physical Layer Procedures Release 8, ARIB STD-T63-36.213, V8.5.0. Dec. 2008.

LTE, $3^{rd}$ Generation Partnership Project, "Technical Specification Group Radio Access Network; Further Advancements for E-UTRA Physical Layer Aspects" Release 9. 3GPP TR 36.814, V0.4.1, Feb. 2009.

LTE, $3^{rd}$ Generation Partnership Project, "Technical Specification Group Radio Access Network; Evolved Universal Terrestrial Radio Access Network (E-UTRAN); X2 Application Protocol (X2AP)" Release 8. 3GPP TS 36.423, V8.4.0, Dec. 2008.

* cited by examiner

DOWNLINK INTER-CELL INTERFERENCE COORDINATION METHOD AND ENB

CROSS-REFERENCE TO RELATED APPLICATIONS

This application is a National Stage of International Application No. PCT/CN2009/071341, filed Apr. 17, 2009, which is hereby incorporated by reference in their entireties.

FIELD OF THE INVENTION

The present invention relates to the wireless communication field, and in particular, to a downlink Inter-Cell Interference Coordination (ICIC) method and an evolved NodeB (eNB).

BACKGROUND OF THE INVENTION

The 4th Generation mobile communication technology is developed and may provide higher peak user throughput, average user throughput, and edge user throughput, and brings better data transmission experience to users. In a Long-Term Evolution (LTE, Long-Term Evolution) system, the downlink ICIC (ICIC, Inter-cell Interference Coordination) may solve an interference problem between neighboring cells effectively, and improve system resource utilization ratio and user experience.

In contrast to an original communication system, a Long-Term Evolution Advanced (LTE-A, Long-Term Evolution Advanced) system uses six newly-added bands: 450-470 MHz, 698-862 MHz, 790-862 MHz, 2.3-2.4 GHz, 3.4-4.2 GHz, and 4.4-4.99 GHz. To improve a data transmission rate, a Carrier Aggregation (Carrier Aggregation, CA) technology is introduced into the LTE-A system. After the CA technology is introduced, a cell may use more than one carrier to transmit downlink data to improve the data transmission rate. However, no downlink ICIC solution for the CA technology is proposed at present.

SUMMARY OF THE INVENTION

Embodiments of the present invention provide a downlink ICIC method and an eNB.

An embodiment of the present invention provides a downlink ICIC method, including:

obtaining, by an evolved NodeB (eNB), information about multiple carriers in a current cell;

obtaining, by the eNB, according to the information about the multiple carriers, a downlink ICIC parameter corresponding to each carrier of the multiple carriers; and sending, by the eNB, the downlink ICIC parameter corresponding to each carrier to a neighboring cell of the current cell so as to enable the neighboring cell to perform, according to the downlink ICIC parameter, downlink interference coordination with the current cell.

An embodiment of the present invention provides an eNB, including:

a multi-carrier information obtaining unit, configured to obtain information about multiple carriers in a current cell;

a downlink ICIC parameter obtaining unit, configured to obtain, according to the information about the multiple carriers, where the information about the multiple carriers is obtained by the multi-carrier information obtaining unit, a downlink ICIC parameter corresponding to each carrier of the multiple carriers; and a downlink ICIC parameter sending unit, configured to send the downlink ICIC parameter corresponding to each carrier to a neighboring cell of the current cell so as to enable the neighboring cell to perform, according to the downlink ICIC parameter, downlink interference coordination with the current cell.

In the downlink ICIC method and the eNB that are provided in the embodiments of the present invention, the downlink ICIC parameter corresponding to each carrier of the multiple carriers are obtained according to the information about the multiple carriers, which may be applicable to the downlink ICIC in a multi-carrier system.

BRIEF DESCRIPTION OF THE DRAWINGS

To describe the technical solutions in the embodiments of the present invention or in the prior art more clearly, the following outlines accompanying drawings involved in the description of the embodiments or the prior art. Apparently, the accompanying drawings outlined below are merely some embodiments of the present invention. Persons of ordinary skill in the art may also derive other drawings from the accompanying drawings without creative efforts.

DETAILED DESCRIPTION OF THE EMBODIMENTS

The following describes a downlink Inter-Cell Interference Coordination method and an eNB according to the embodiments of the present invention in detail with reference to the accompanying drawings.

It should be specified that, the embodiments to be described are merely part of rather than all of the embodiments of the present invention. All other embodiments, which may be derived by those of ordinary skill in the art from the embodiments of the present invention without creative efforts, shall fall within the protection scope of the present invention.

Figure 1:
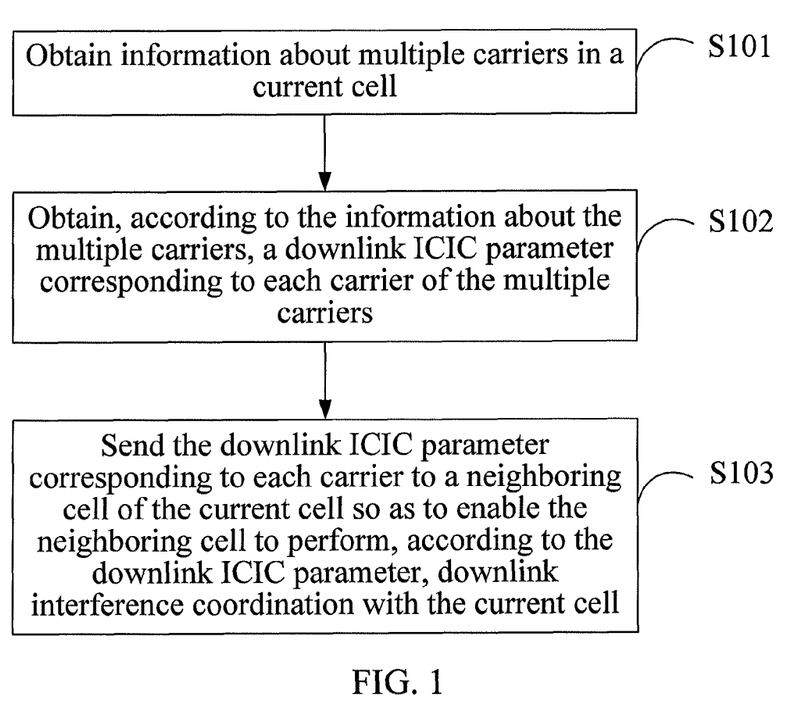
FIG. 1 is a flowchart of a downlink ICIC method according to a first embodiment of the present invention.

As shown in FIG. 1, a first embodiment of the present invention provides a downlink ICIC method, including:

S101: Obtain information about multiple carriers in a current cell. Specifically, the information about the multiple carriers may specifically be information about downlink multiple carriers.

S102: Obtain, according to the information about the multiple carriers, a downlink ICIC parameter corresponding to each carrier of the multiple carriers.

S103: Send the downlink ICIC parameter corresponding to each carrier to a neighboring cell of the current cell so as to enable the neighboring cell to perform, according to the downlink ICIC parameter, downlink interference coordination with the current cell.

The method provided in the first embodiment of the present invention is applicable to downlink ICIC in a multi-carrier system.

The method for obtaining the downlink ICIC parameter corresponding to each carrier of the multiple carriers in S102 may specifically be divided into methods such as emulation, field test and table lookup.

Figure 2:
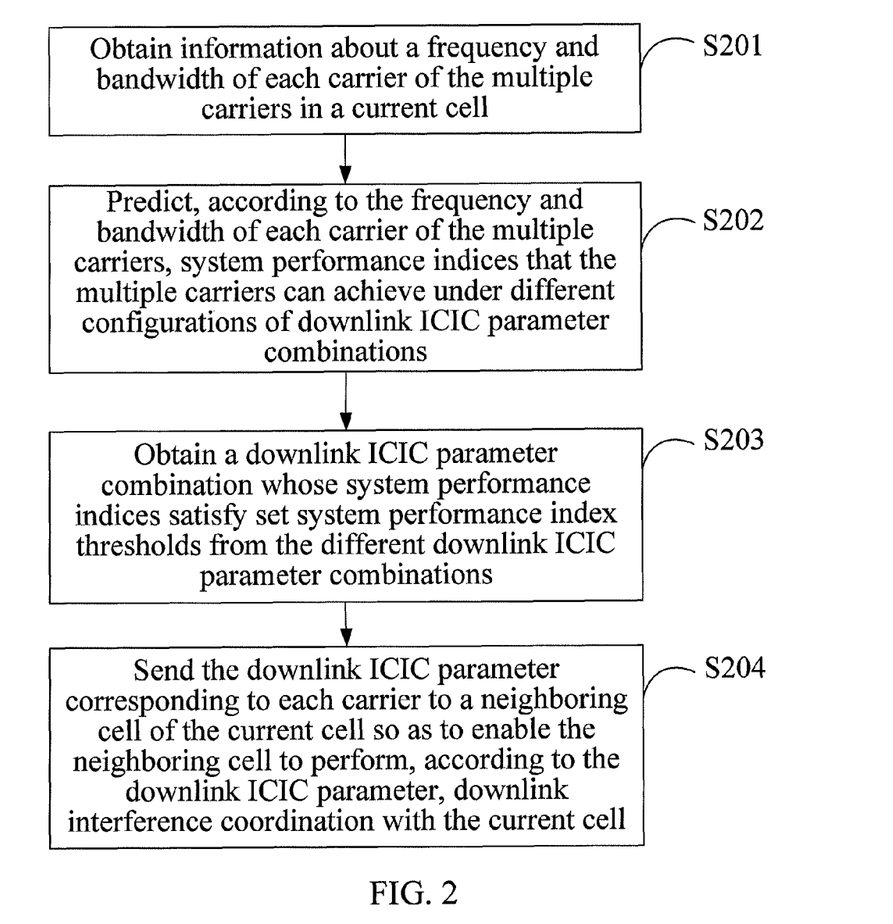
FIG. 2 is a flowchart of a downlink ICIC method according to a second embodiment of the present invention.

As shown in FIG. 2, a second embodiment of the present invention provides a downlink ICIC method, including:

S201: Obtain information about multiple carriers in a current cell. The information includes a frequency and bandwidth of each carrier of the multiple carriers, and the multiple carriers may specifically be aggregated carriers.

S202: Predict, ac cording to the frequency and bandwidth of each carrier of the multiple carriers, system performance indices that the multiple carriers can achieve under different configurations of downlink ICIC parameter combinations. Each downlink ICIC parameter in the downlink ICIC parameter combinations corresponds to each carrier of the multiple carriers.

The system performance indices may include: throughput and/or bit error rate. Specifically, the throughput may refer to average throughput of a cell and/or edge user throughput of a cell; and the bit error rate may refer to initial transmission block error rate (IBLER, Initial transmission Block Error Rate) or initial transmission success rate.

Predict, according to the frequency and bandwidth of each carrier of the multiple carriers, system performance indices that the multiple carriers can achieve under different configurations of downlink ICIC parameter combinations. The prediction may specifically be emulation according to a system model. An additional parameter may also be added during the emulation to make the emulation result closer to an actual condition. For example, a network topology structure parameter that describes whether different carriers of the multiple carriers provide equal coverage may be added. The model may also be optimized according to a specific scenario, for example, according to a condition that the multiple carriers are aggregated carriers.

S203: Obtain a downlink ICIC parameter combination whose system performance indices satisfy preset system performance index thresholds from different downlink ICIC parameter combinations.

Several system performance index thresholds may be preset, for example, average throughput threshold of a cell, and/or edge user throughput threshold of a cell, and/or IBLER threshold (the IBLER threshold may be replaced with an initial transmission success rate threshold). Under the corresponding downlink ICIC parameter configuration, the system performance index of each carrier of the multiple carriers needs to satisfy the set system performance index thresholds, and specifically, may be greater than or equal to the average throughput threshold of a cell, and/or greater than or equal to the edge user throughput threshold of a cell, and/or greater than or equal to the initial transmission success rate threshold. "Greater than or equal to the initial transmission success rate threshold" may also be equivalent to "less than the IBLER threshold".

S204: Send the downlink ICIC parameter corresponding to each carrier to a neighboring cell of the current cell so as to enable the neighboring cell to perform, according to the downlink ICIC parameter, downlink interference coordination with the current cell.

A process for performing, by the neighboring cell, the downlink interference coordination may specifically include:

The neighboring cell performs, according to the received downlink ICIC parameter, allocating and scheduling on a physical resource block on each carrier, so as to avoid downlink interference between cells and accomplish the purpose of downlink ICIC.

The method provided in the second embodiment of the present invention is applicable to downlink ICIC in a multi-carrier system.

Figure 3:
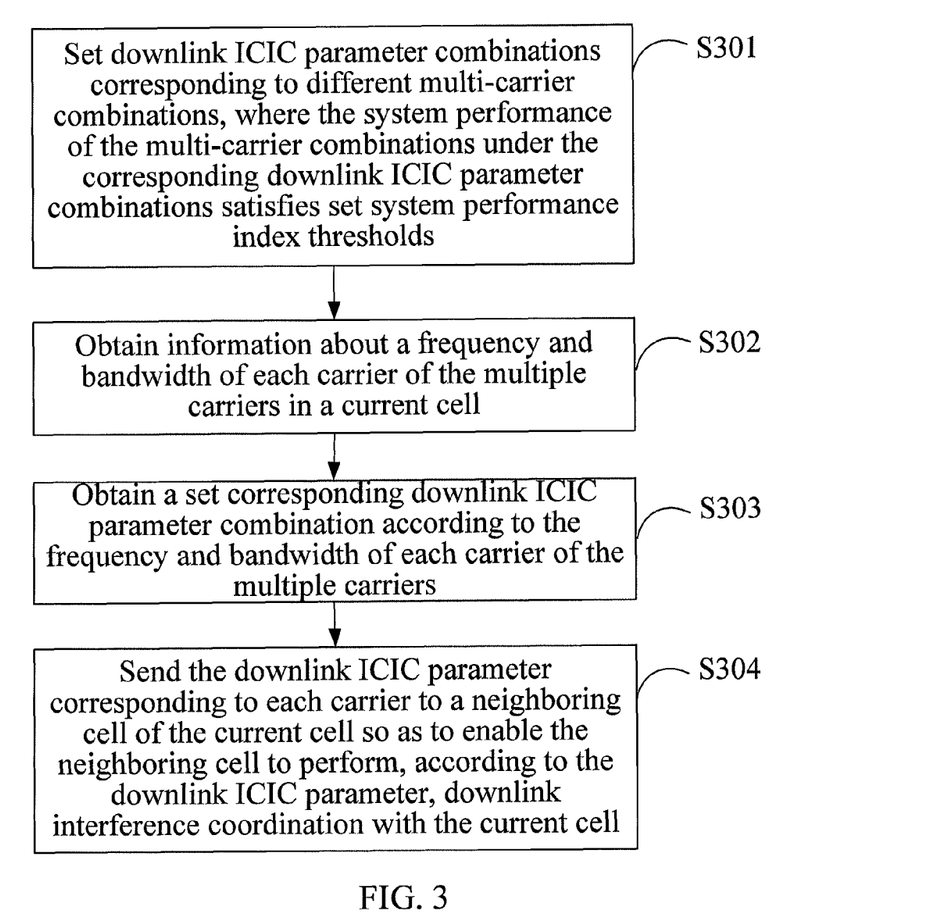
FIG. 3 is a flowchart of a downlink ICIC method according to a third embodiment of the present invention.

As shown in FIG. 3, a third embodiment of the present invention provides a downlink ICIC method, including:

S301: Obtain information about multiple carriers in a current cell. The information includes a frequency and bandwidth of each carrier of the multiple carriers, and the multiple carriers may specifically be aggregated carriers.

S302: Set downlink ICIC parameter combinations corresponding to different multi-carrier combinations. The system performance of the multi-carrier combinations under the corresponding configuration of downlink ICIC parameter combination satisfies set system performance index thresholds. Each downlink ICIC parameter in the downlink ICIC parameter combination corresponds to each carrier of the multiple carriers.

The downlink ICIC parameter combination includes multiple downlink ICIC parameters, and each downlink ICIC parameter in the downlink ICIC parameter combination corresponds to the carrier in the multi-carrier combination in turn.

Different from the second embodiment, to save network-side operation resources, various corresponding multi-carrier combinations and the downlink ICIC parameter combinations that satisfy the system performance index thresholds may be obtained beforehand according to emulation or field test, and preset in the system. The definitions of system performance indices, system performance index threshold, and "satisfy the system performance index thresholds" are the same as those described in the second embodiment.

S303: Obtain, according to the frequency and bandwidth of each carrier of the multiple carriers, the preset corresponding downlink ICIC parameter combination.

When parameters need to be selected, the system may use the information about the frequency and bandwidth of each carrier of the multiple carriers as indices to search for the preset corresponding downlink ICIC parameter combination.

S304: Send the downlink ICIC parameter corresponding to each carrier to a neighboring cell of the current cell so as to enable the neighboring cell to perform, according to the downlink ICIC parameter, downlink interference coordination with the current cell.

A process for performing, by the neighboring cell, the downlink interference coordination may specifically include:

The neighboring cell performs, according to the received downlink ICIC parameter, allocating and scheduling on a physical resource block on each carrier, so as to avoid downlink interference between cells and accomplish the purpose of downlink ICIC.

The method provided in the third embodiment of the present invention is applicable to downlink ICIC in a multi-carrier system. Moreover, because presetting method is used, the network-side operation resources can be effectively saved.

The downlink ICIC parameters in the foregoing embodiment may include a Relative Narrowband Transmit Power (RNTP, Relative Narrowband TX Power) threshold.

In a fourth embodiment of the present invention, the implementation of the present invention is described in detail by taking an example in which the ICIC parameter is an RNTP threshold.

An eNB (eNB, Evolved Universal Terrestrial Radio Access Network NodeB) allocates downlink power by deciding Energy Per Resource Element (EPRE, Energy Per Resource Element) in downlink transmission. Constraint conditions of this process are expressed through the RNTP and as shown below:

$$RNTP(n_{PRB}) = \begin{cases} 0 & \text{if } \frac{E_A(n_{PRB})}{E_{max\_nom}^{(p)}} \leq RNTP_{threshold} \\ 1 & \text{if } \frac{E_A(n_{PRB})}{E_{max\_nom}^{(p)}} > RNTP_{threshold} \end{cases}$$

In the foregoing formula, $E_A(n_{PRB})$ is a maximum EPRE of Physical Downlink Shared Channel (PDSCH) REs (RE, Resource Element) of UE (UE, User Equipment) in Orthogonal Frequency Division Multiplex (OFDM) symbols excluding Reference Signals (RS) on a PRB (PRB, Physical Resources Block). $n_{PRB}$ is a number of the PRB, and $n_{PRB}=0, \ldots, N_{RB}^{DL}-1$, where $N_{RB}^{DL}$ is the number of PRBs included in the downlink bandwidth. $E_{max\_nom}^{(p)}$ is an energy spectral density of a maximum output power of an antenna port p of the eNB on the entire downlink bandwidth within time of an OFDM symbol. $RNTP_{threshold}$ is an RNTP threshold, and generally may has the following value range:

$$RNTP_{threshold} \in \{-\infty, -11, -10, -9, -8, -7, -6, -5, -4, -3, -2, -1, 0, +1, +2, +3\}_{[dB]}.$$

When the value of $RNTP(n_{PRB})$ is 0, it indicates that the corresponding PRB imposes no interference on a neighboring cell, and when the value of $RNTP(n_{PRB})$ is 1, it indicates that the corresponding PRB imposes interference on the neighboring cell. The eNB sends the $RNTP(n_{PRB})$ and the corresponding RNTP threshold to the neighboring cell as downlink ICIC parameters. The neighboring cell uses the parameters to perform downlink interference coordination with the cell under the eNB.

For discrete carrier aggregation, different carriers have different propagation environments; for continuous carrier aggregation, different carriers have different interference conditions. Moreover, for continuous carrier aggregation in a same band, discrete carrier aggregation in a same band, and discrete carrier aggregation in multiple bands, different carriers may have different system performance requirements, for example, average throughput of a cell, and/or edge user throughput of a cell, and/or initial transmission success rate. Therefore, for downlink power allocation based on multiple carriers, the eNB needs to use different transmit power and/or power spectral density on different carriers. However, the downlink ICIC parameters based on multiple carriers (such as RNTP threshold) need to be configured according to different carriers.

Figure 4:
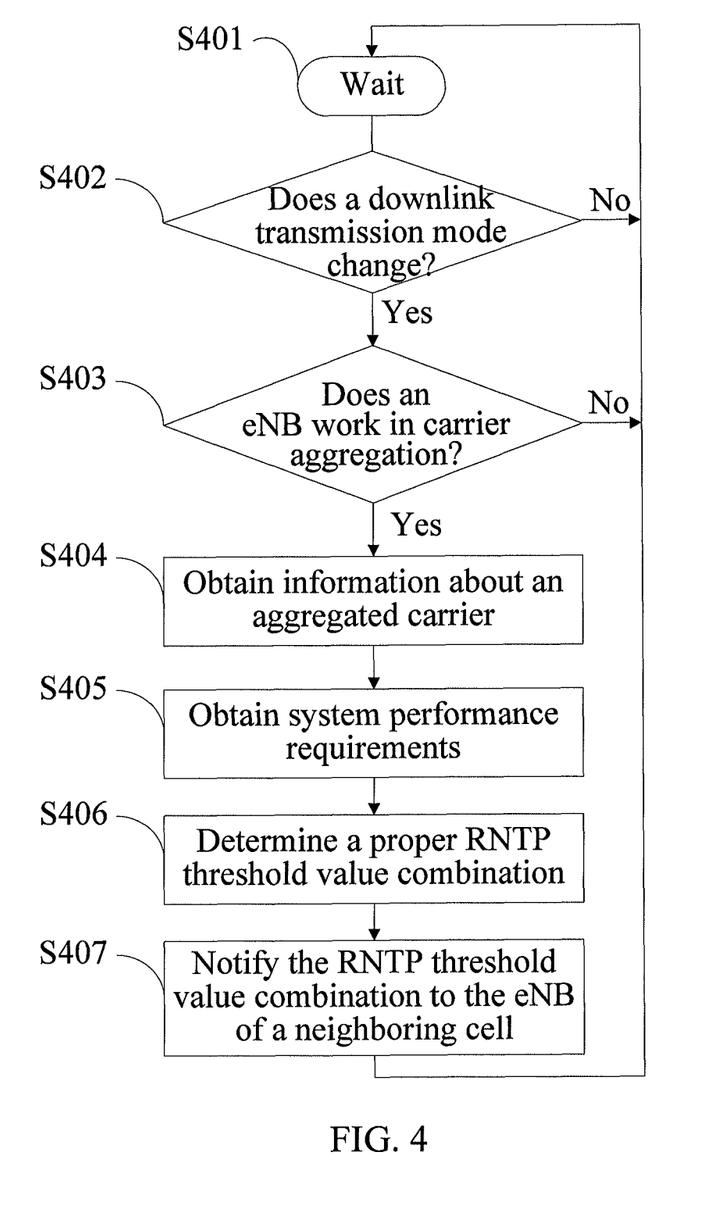
FIG. 4 is a flowchart of a downlink ICIC method according to a fourth embodiment of the present invention.

The downlink ICIC method specifically includes the following steps:

S401: Wait.

S402: Judge whether a downlink transmission mode changes. If the downlink transmission mode changes, execute S403; if the downlink transmission mode does not change, execute S401.

S403: Judge whether to work in a downlink carrier aggregation condition. If the downlink carrier aggregation condition exists, execute S404; if the downlink carrier aggregation condition does not exist, execute S401.

S404: Obtain information about an aggregated carrier of downlink transmission. The information includes a frequency and bandwidth of each carrier in the aggregated carrier. An aggregation mode of the carrier may be judged according to the foregoing frequency and bandwidth of each carrier. Certainly, in addition to the obtained information about the aggregated carrier, other information pertinent to the RNTP threshold may also be obtained, for example, network topology structure information, geographic information, and user distribution information. The application scenarios include equal-coverage scenario and unequal-coverage scenario. In an equal-coverage scenario, the coverage of carriers is the same no matter what carriers are aggregated; in an unequal-coverage scenario, different carriers have the same or different transmit power but have different coverage.

S405: Obtain the system performance requirements, namely, system performance index thresholds, for example, average throughput threshold of a cell, and/or edge user throughput threshold of a cell, and/or initial transmission success rate threshold.

S406: Determine, according to the carrier information obtained in step S404 and the system performance requirements obtained in step S405, a proper RNTP threshold value combination, as shown below: ($RNTP_{threshold}^1$, $RNTP_{threshold}^2$, ..., $RNTP_{threshold}^N$), which is a RNTP threshold value combination corresponding to N carriers in the carrier aggregation.

The proper RNTP threshold value combination may specifically be determined through two methods: emulation or table lookup, as detailed below:

Predict, according to the frequency and bandwidth of each carrier in the aggregated carrier, system performance indices that the aggregated carrier can achieve under different configurations of RNTP threshold value combinations. The prediction may specifically be emulation according to a system model. An additional parameter may also be added during the emulation to make the emulation result closer to an actual condition. For example, network topology structure information, geographic information, or user distribution information may be used. Among RNTP threshold value combinations to be selected, the RNTP threshold value combination whose system performance indices satisfy the set system performance index thresholds is obtained.

The following describes the process of selecting parameters, for example, supposing that two carriers are aggregated:

Table 1 show parameters of two aggregated carriers. In the parameters, the carrier aggregation mode, and the number of carriers may be obtained directly, or inferred according to the frequency and bandwidth of the carrier.

TABLE 1

| | Parameter setting |
|---|---|
| Parameter | Setting |
| Carrier aggregation mode | Multi-band discrete carrier aggregation mode |
| Number of carriers | 2 |
| Frequency | f1, f2 |
| Bandwidth | BW1, BW2 |
| Network topology structure | Equal-coverage scenario |

The foregoing parameters are emulated through the system model, or the system performance indices under different RNTP threshold combinations are obtained through field test.

Different RNTP threshold combinations may be selected, according to the number of carriers, from an RNTP threshold set {a, b, c, d} to be selected, where a, b, c, and d represent different RNTP threshold values respectively.

The parameter values and the number of parameters in the set to be selected may be determined according to actual conditions. The selected RNTP threshold combinations may be all possible combinations of parameters in the set to be selected, for example, (a, b), (a, c), (a, d), (b, c), (b, d), (b, a), (c, a), (d, a), (c, b), and (d, b). A first parameter in the combination may correspond to a carrier f1, a second parameter may correspond to a carrier f2. Certainly, to save system calculation resources, part of the combinations may be selected for emulation or test.

Several system performance index thresholds may be preset, for example, average throughput threshold of a cell, and/or edge user throughput threshold of a cell, and/or IBLER threshold (the IBLER threshold may also be replaced with an initial transmission success rate threshold).

If the initial transmission success rate threshold is set to TH1, any combination of the RNTP threshold value combinations whose predicted value of the initial transmission success rate is greater than TH1 (namely, the IBLER is less than or equal to (1−TH1)) may be selected from the RNTP threshold value combinations to be selected, and used as a proper RNTP threshold value combination available to the system.

Optionally, to take the impact imposed by the RNTP threshold value combinations on the system performance indices into consideration, in addition to the initial transmission success rate threshold value, an average throughput threshold of a cell TH2 may be set additionally. Therefore, any combination of the RNTP threshold value combinations whose predicted value of the average throughput of a cell is greater than TH2 may be selected from the RNTP threshold value combinations whose predicted value of the initial transmission success rate is greater than TH1, and used as a proper RNTP threshold value combination available to the system.

Optionally, an edge user throughput threshold of a cell TH3 may also be set, and any combination whose predicted value of the initial transmission success rate is greater than TH1, predicted value of the average throughput of a cell is greater than TH2, and predicted value of the edge user throughput of a cell is greater than TH3 may be selected from the RNTP threshold value combinations as a proper RNTP threshold value combination available to the system.

The foregoing threshold values may be used together, that is, any two of TH1, TH2, and TH3 are used as judgment criteria; or the foregoing threshold values may be used separately, that is, any one of TH1, TH2 and TH3 is used as a judgment criterion.

To save network-side operation resources, another optional solution is: RNTP threshold value combinations that correspond to various aggregated carrier combinations and satisfy the system performance index thresholds may be obtained beforehand through emulation or field test, and are preset in the system. The system may search for the preset corresponding RNTP threshold value combination by using the information about the frequency and bandwidth of each carrier in the aggregated carrier as indices.

S407: Notify the RNTP threshold value combination determined in step S406 to the eNB of the neighboring cell, so as to enable the neighboring cell to perform, according to the foregoing determined RNTP threshold combination, downlink interference coordination with the current cell. The RNTP threshold combination may specifically be transmitted through a Load Information (LI) message of an X2 interface.

Specifically, the eNB of the neighboring cell performs allocating and scheduling on a PRB on each carrier according to the received RNTP($n_{PRB}$) value of each carrier in the aggregated carrier and the RNTP threshold value corresponding to each carrier (the RNTP threshold value is obtained from the RNTP threshold combination carried in the LI), so as to avoid downlink interference between cells and accomplish the purpose of downlink ICIC.

The RNTP($n_{PRB}$) value of each carrier in the aggregated carrier and the RNTP threshold combination of the foregoing carrier may be carried in a same LI at the same time; or the RNTP threshold values in the RNTP threshold combinations of the carriers may be carried in multiple LI and sent respectively.

An embodiment of the present invention provides an eNB to perform the steps of the foregoing method embodiments.

Figure 5:
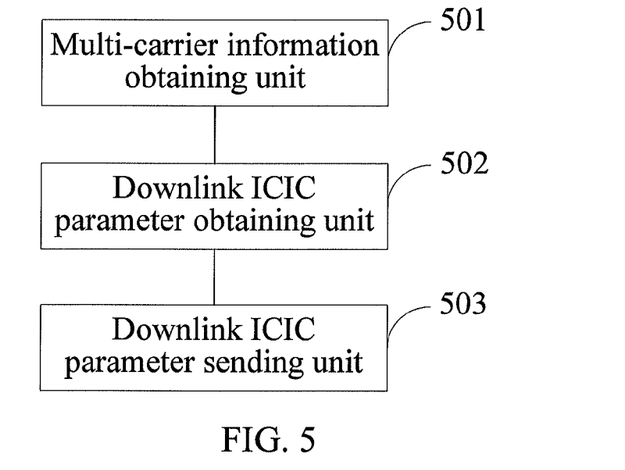
FIG. 5 is a schematic structural diagram of an eNB according to a fifth embodiment of the present invention.

As shown in FIG. 5, a fifth embodiment of the present invention provide an eNB, including:

a multi-carrier information obtaining unit 501, configured to obtain information about multiple carriers in a current cell, where the current cell may refer to a cell under the eNB;

a downlink ICIC parameter obtaining unit 502, configured to obtain, according to the information about the multiple carriers, where the information about the multiple carriers is obtained by the multi-carrier information obtaining unit 501, a downlink ICIC parameter corresponding to each carrier of the multiple carriers; and a downlink ICIC parameter sending unit 503, configured to send the downlink ICIC parameter corresponding to each carrier to a neighboring cell of the current cell so as to enable the neighboring cell to perform, according to the downlink ICIC parameter, downlink interference coordination with the current cell.

Figure 6:
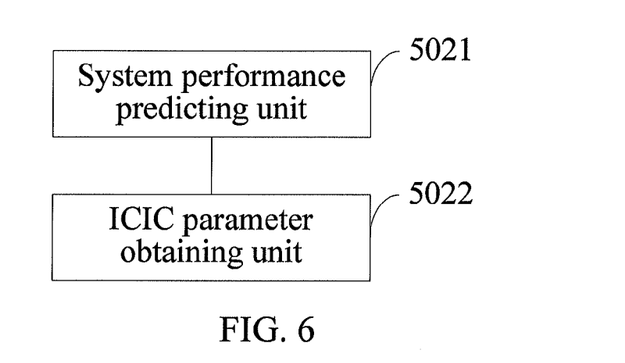
FIG. 6 is a schematic structural diagram of a downlink ICIC parameter obtaining unit according to a fifth embodiment of the present invention.

As shown in FIG. 6, the downlink ICIC parameter obtaining unit 502 may specifically include:

a system performance predicting unit 5021, configured to: predict, according to a frequency and bandwidth of each carrier of the multiple carriers, system performance indices that the multiple carriers can achieve under different configurations of downlink ICIC parameter combinations, where each downlink ICIC parameter in the downlink ICIC parameter combinations corresponds to each carrier of the multiple carriers; and an ICIC parameter selecting unit 5022, configured to select a downlink ICIC parameter combination whose system performance indices satisfy set system performance index thresholds from the different downlink ICIC parameter combinations.

Figure 7:
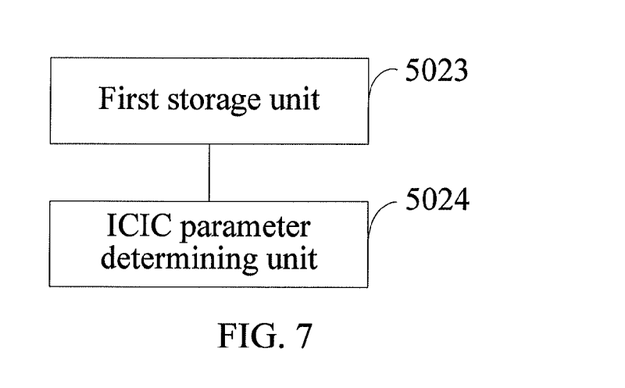
FIG. 7 is another schematic structural diagram of a downlink ICIC parameter obtaining unit according to a fifth embodiment of the present invention.

Optionally, in another implementation, as shown in FIG. 7, the downlink ICIC parameter obtaining unit may specifically include:

a first storage unit 5023, configured to store downlink ICIC parameter combinations corresponding to different multi-carrier combinations, where the system performance of the multi-carrier combinations under the corresponding configuration of downlink ICIC parameter combination satisfies the set system performance index thresholds, and each downlink ICIC parameter in the downlink ICIC parameter combination corresponds to each carrier of the multiple carriers; and an ICIC parameter determining unit 5024, configured to determine, according to the frequency and bandwidth of each carrier of the multiple carriers, the preset corresponding downlink ICIC parameter combination in the first storage unit.

The apparatus provided in the embodiment of the present invention is applicable to downlink ICIC in a multi-carrier system.

It should be noted that the units included in the foregoing apparatus embodiment are sorted according to functional logics, but are not limited to the foregoing sorting. Any sorting of the units is appropriate as long as the functions of the corresponding units are implemented properly. Moreover, the names of the functional units are given here for the purpose of identification only, and shall not be construed as limitations on the protection scope of the present invention.

According to the description about the foregoing embodiments, those skilled in the art are clearly aware that the present invention may be implemented through hardware, or through software in addition to a necessary universal hardware platform. Based on such understanding, the technical solutions of the present invention may be embodied in a software product. The software product may be stored in a nonvolatile storage medium (such as a CD-ROM, a USB flash disk, or a mobile hard disk), and may include several instructions that enable a computer device (such as a personal computer, a server, or a network device) to perform the method specified in any embodiment of the present invention.

The preceding descriptions are merely exemplary embodiments of the present invention, but not intended to limit the protection scope of the present invention. Any modifications, variations or replacement that may be easily derived by those skilled in the art should fall within the protection scope of the present invention. Therefore, the protection scope of the present invention is subject to the appended claims.

What is claimed is:

1. A downlink Inter-Cell Interference Coordination (ICIC) method, comprising:
   obtaining, by an evolved NodeB (eNB), information about multiple carriers in a current cell;
   obtaining, by the eNB, according to the information comprising a frequency and bandwidth of each carrier of the multiple carriers, a downlink ICIC parameter corresponding to each carrier of the multiple carriers, wherein the obtaining the downlink ICIC parameter comprises:
   predicting, by the eNB, according to the frequency and bandwidth of each carrier of the multiple carriers, system performance indices that the multiple carriers can achieve under different configurations of downlink ICIC parameter combinations, wherein each downlink ICIC parameter in the downlink ICIC parameter combinations corresponds to each carrier of the multiple carriers, and
   obtaining, by the eNB, a downlink ICIC parameter combination whose system performance indices satisfy set system performance index thresholds from the different downlink ICIC parameter combinations; and
   sending, by the eNB, the downlink ICIC parameter corresponding to each carrier to a neighboring cell of the current cell so as to enable the neighboring cell to perform, according to the downlink ICIC parameter, downlink interference coordination with the current cell.

2. The method according to claim 1, wherein:
   the obtaining, by the eNB, according to the information about the multiple carriers, a downlink ICIC parameter corresponding to each carrier of the multiple carriers comprises:
   setting, by the eNB, downlink ICIC parameter combinations corresponding to different multi-carrier combinations, wherein system performance of the multi-carrier combinations under the corresponding configuration of downlink ICIC parameter combination satisfies the system performance index thresholds, and each downlink ICIC parameter in the downlink ICIC parameter combination corresponds to each carrier of the multiple carriers; and
   obtaining, by the eNB, a preset corresponding downlink ICIC parameter combination according to the frequency and bandwidth of each carrier of the multiple carriers.

3. The method according to claim 1, wherein: the system performance indices comprises at least one of throughput and bit error rate.

4. The method according to claim 2, wherein the system performance indices comprises at least one of throughput and bit error rate.

5. The method according claim 1, wherein: the multiple carriers are aggregated carriers.

6. The method according to claim 1, wherein: the downlink ICIC parameters comprise a Relative Narrowband Transmit Power (RNTP) threshold.

7. The method according to claim 1, wherein:
   the sending the downlink ICIC parameter corresponding to each carrier to a neighboring cell of the current cell is:
   sending the downlink ICIC parameter corresponding to each carrier to the neighboring cell of the current cell through Load Information (LI).

8. An evolved NodeB (eNB), comprising:
   a multi-carrier information obtaining unit, configured to obtain information about multiple carriers in a current cell;
   a downlink Inter-Cell Interference Coordination (ICIC) parameter obtaining unit, configured to obtain, according to the information about the multiple carriers, where the information about the multiple carriers is obtained by the multi-carrier information obtaining unit, a downlink ICIC parameter corresponding to each carrier of the multiple carriers; and
   a downlink ICIC parameter sending unit, configured to send the downlink ICIC parameter corresponding to each carrier to a neighboring cell of the current cell so as to enable the neighboring cell to perform, according to the downlink ICIC parameter, downlink interference coordination with the current cell;
   wherein the downlink ICIC parameter obtaining unit comprises:
   a system performance predicting unit, configured to: predict, according to a frequency and bandwidth of each carrier of multiple carriers, system performance indices that the multiple carriers can achieve under different configurations of downlink ICIC parameter combinations, wherein each downlink ICIC parameter in the downlink ICIC parameter combinations corresponds to each carrier of the multiple carriers; and
   an ICIC parameter selecting unit, configured to select a downlink ICIC parameter combination whose system performance indices satisfy set system performance index thresholds from the different downlink ICIC parameter combinations.

9. The eNB according to claim 8, wherein:
   the downlink ICIC parameter obtaining unit comprises:
   a first storage unit, configured to store downlink ICIC parameter combinations corresponding to different multi-carrier combinations, wherein system performance of the multi-carrier combinations under the corresponding configuration of downlink ICIC parameter combination satisfies set system performance index thresholds, and each downlink ICIC parameter in the downlink ICIC parameter combination corresponds to each carrier of the multiple carriers; and an ICIC parameter determining unit, configured to determine a set corresponding downlink ICIC parameter combination in the first storage unit according to a frequency and bandwidth of each carrier of the multiple carriers.

* * * * *